United States Patent
Harayama et al.

[11] Patent Number: 6,013,380
[45] Date of Patent: Jan. 11, 2000

[54] COMPOSITE CHROMIUM PLATING FILM AND SLIDING MEMBER COVERED THEREOF

[75] Inventors: Akira Harayama; Toshiaki Imai, both of Okaya, Japan

[73] Assignee: Teiko Piston Ring Co., Ltd., Tokyo, Japan

[21] Appl. No.: 08/967,782

[22] Filed: Nov. 10, 1997

[30] Foreign Application Priority Data

Nov. 11, 1996 [JP] Japan .................................. 8-314296

[51] Int. Cl.⁷ .............................. B32B 15/04; B32B 15/00
[52] U.S. Cl. .......................... 428/627; 428/666; 277/440; 277/442; 277/443; 277/444
[58] Field of Search .................... 428/613, 627, 428/666, 935; 277/440, 442, 443, 444

[56] References Cited

U.S. PATENT DOCUMENTS

| | | | |
|---|---|---|---|
| 4,846,940 | 7/1989 | Neuhauser et al. | 204/16 |
| 5,295,696 | 3/1994 | Harayama et al. | 277/138 |
| 5,601,293 | 2/1997 | Fukutome et al. | 277/235 A |
| 5,648,620 | 7/1997 | Stenzel et al. | 75/232 |

FOREIGN PATENT DOCUMENTS

| | | |
|---|---|---|
| 0 668 375 A1 | 8/1995 | European Pat. Off. . |
| 59-28640 | 7/1984 | Japan . |
| 61-3895 | 1/1986 | Japan . |
| 62-120498 | 1/1987 | Japan . |
| 62-56600 | 3/1987 | Japan . |

Primary Examiner—Paul Thibodeau
Assistant Examiner—Holly C. Rickman
Attorney, Agent, or Firm—Armstrong, Westerman, Hattori, McLeland & Naughton

[57] ABSTRACT

A piston ring formed with a nitrided layer over all surfaces and formed with a composite chromium plating film over the nitrided layer in the outer circumferential surface. The composite chromium plating film has a network of cracks formed on the outer surface and interior. $Si_3N_4$ particles are fixed in these cracks. The average size of the $Si_3N_4$ particles is 0.8 to 3 μm and the dispersion ratio of the $Si_3N_4$ particles is 3 to 15 percent by volume.

4 Claims, 6 Drawing Sheets

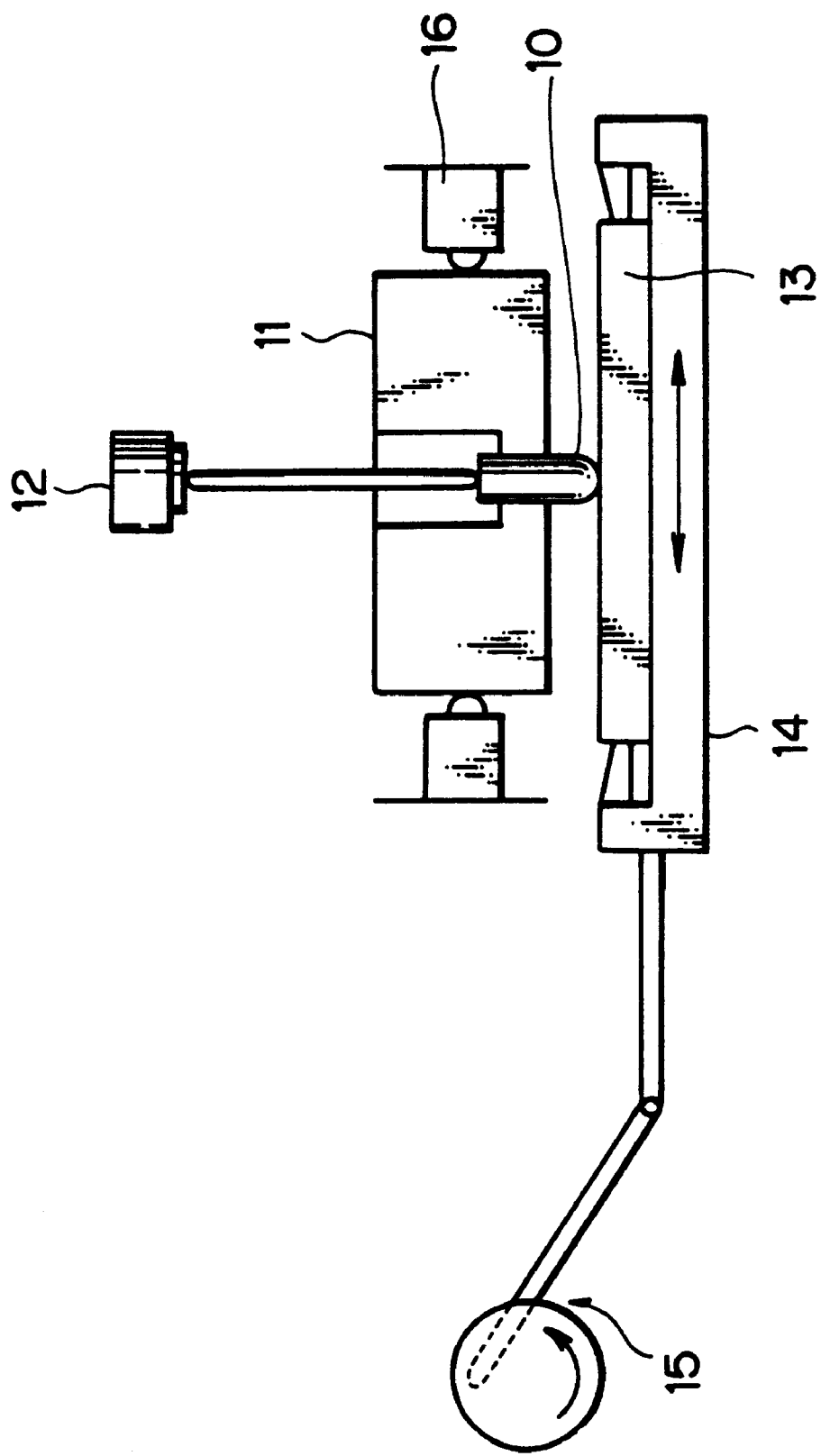

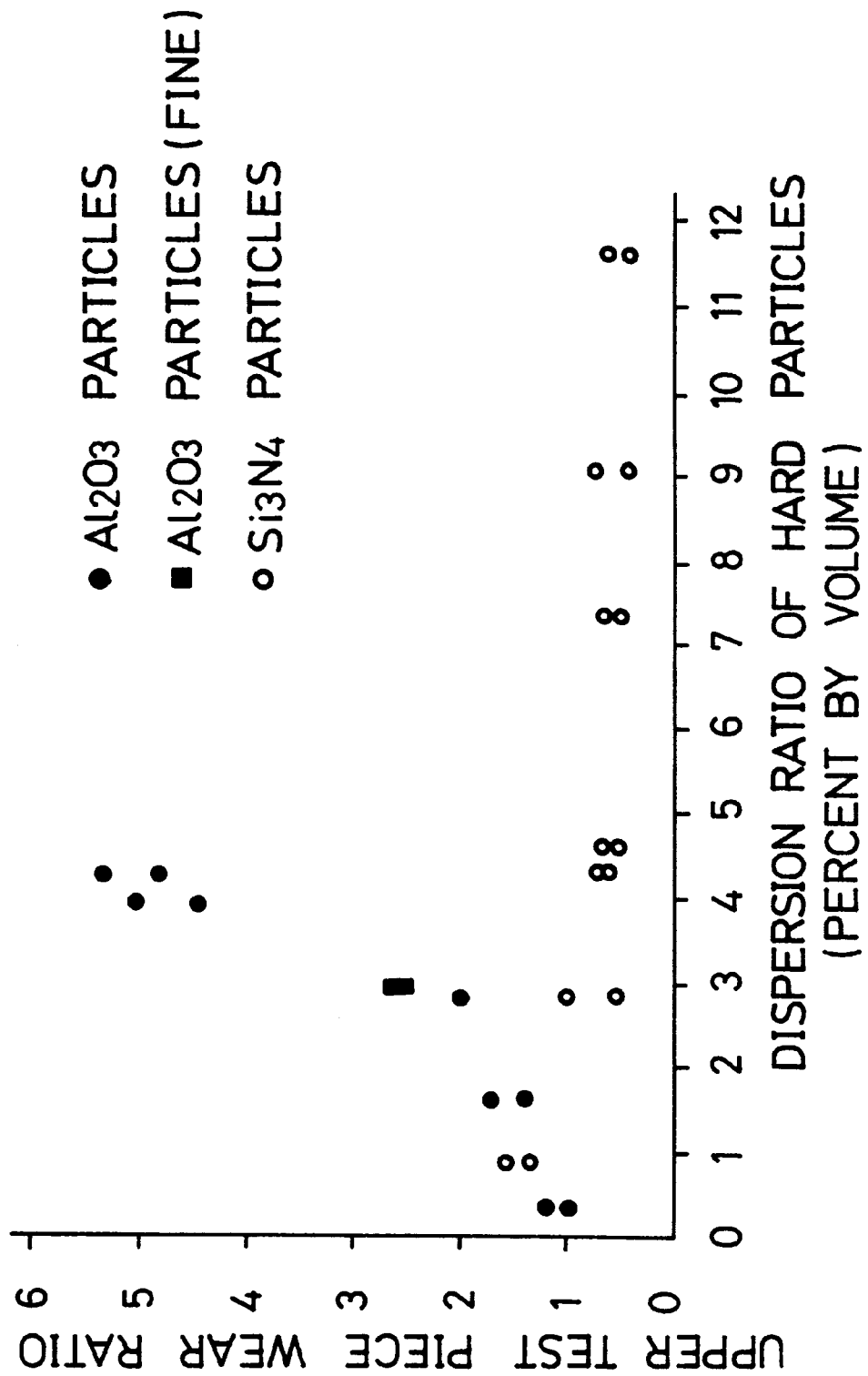

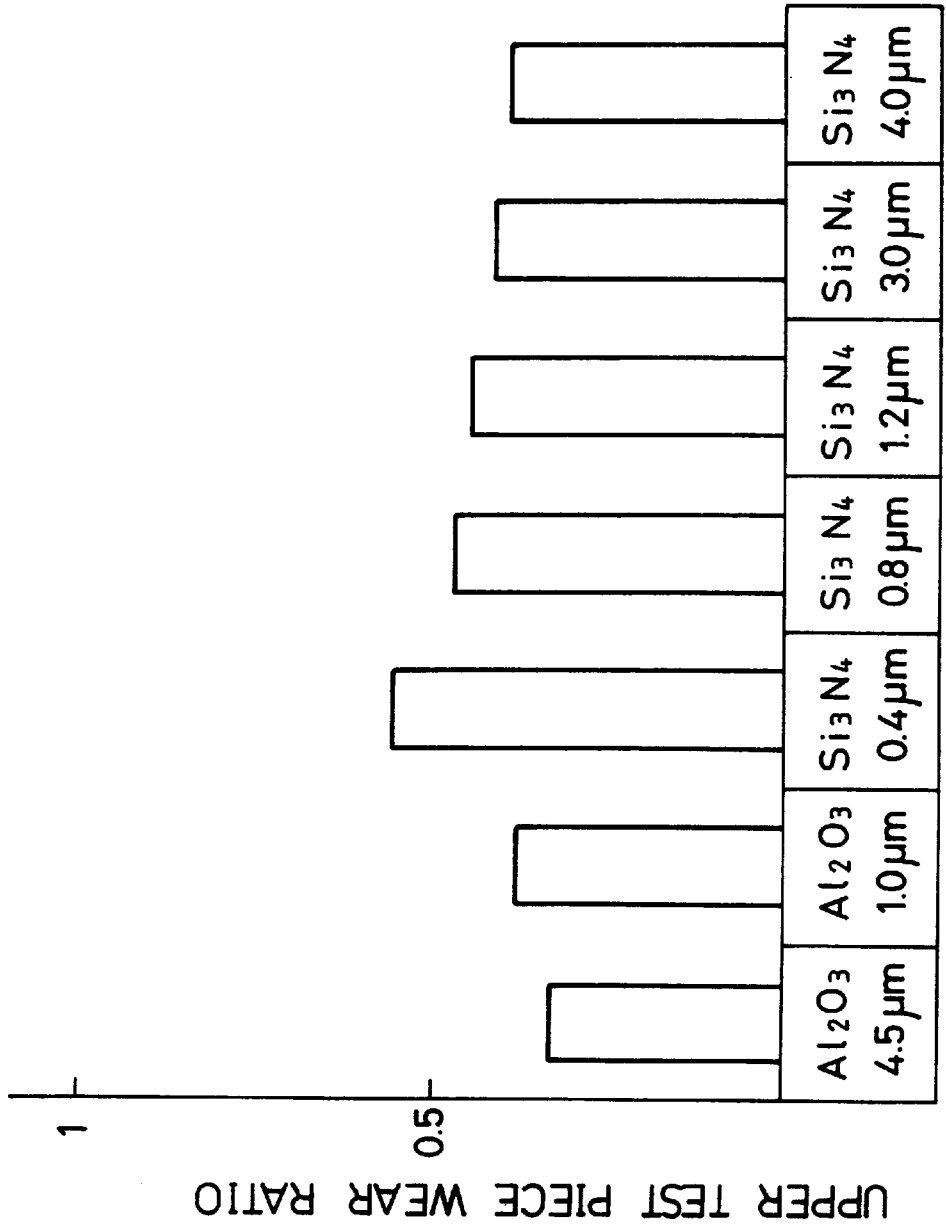

COMPOSITE CHROMIUM PLATING FILM AND SLIDING MEMBER COVERED THEREOF

BACKGROUND OF THE INVENTION

1. Field of the Invention

This invention relates to a composite chromium plating film containing hard particles in a network of cracks formed on the hard chromium plating film and to sliding members covered with said film such as vanes in compressors or piston rings in internal combustion engines.

2. Description of the Related Art

Dispersing hard particles within a hard chromium plating film has been attempted to improve the wear resistance of the chromium plating film. Methods proposed up until now for dispersing hard particles within the hard chromium plating film are as follows.

A pulse electrolytic method (Japanese Patent Publication No. 59-028640) electrolyzing repetitively utilizing a comparatively low current density for codeposition of the hard particles and, a current density at which the chromium plating electrically deposits at normal speed.

A method (Japanese Patent Laid-open No. 61-003895) adding rare earth elements or compounds of rare earth elements to the chromium plating bath.

A method (Japanese Patent Laid-open No. 62-120498) adding self-lubricating particles and hard particles to a trivalent chromium plating bath.

However, these methods have drawbacks in that none of these methods are practical to use and these methods prove difficult to reproduce in our follow-up testing. Further problems are that the dispersion ratio was extremely low or the plating speed is extremely low.

The purpose of the composite chromium plating films mentioned above is to uniformly disperse hard particles into the hard chromium plating film. There is another method using a network of enlarged cracks containing hard particles in the hard chromium plating film (Japanese Patent Laid-open No. 62-56600). This method provides a composite chromium plating with satisfactory plating speed, control of the dispersion ratio and reproducibility.

The items disclosed in the Japanese Patent Laid-open No. 62-56600 are as follows.

Composite chromium plating film thickness: 10–100 $\mu$m

Crack width: 0.5 $\mu$m or more, and even 1 $\mu$m or more

Hard particle size: 0.5 to 15 $\mu$m (0.5 to 5 $\mu$m in the embodiment)

Hard particles: WC, $Al_2O_3$, SiC, $Si_3N_4$, BC, diamond

This composite chromium plating film is actually utilized for piston rings in certain low-load diesel engines in Europe. The specifications for this commercially utilized composite chromium plating film are as follows.

Film thickness: 100–200 $\mu$m

Film hardness: Vickers hardness 850 to 1000

Hard particles: $Al_2O_3$ (pulverized particles)

Hard particles average size: 4.5 $\mu$m

Hard particles dispersion ratio: 5 percent by volume

However this piston ring covered with the above mentioned composite chromium plating film possesses excellent self-wear resistance and scuffing resistance, but wears down the mating material by large amounts and causes problems by drastically increasing wear in the cylinder bore. Accordingly the piston ring formed with the above mentioned composite chromium plating film is unsuitable for use in high load diesel engines or gasoline engines.

The type of hard particles and their total content in the above mentioned composite chromium plating film is thought to influence the amount of wear on the mating material, but Japanese Patent Laid-open No. 62-56600 makes absolutely no mention of this. Further, unlike the composite plating of nickel or Ni—Co—P types used in the conventional art, the above mentioned composite chromium plating has a different hard particle distribution and matrix metal, so alleviating the wear on piston ring mating material by utilizing the available knowledge of composite platings in the conventional art is impossible.

SUMMARY OF THE INVENTION

It is an object of this invention to provide a composite chromium plating film containing hard particles in a network of cracks formed in a hard chromium plating film, giving superior wear resistance and scuffing resistance and minimal wear on the sliding surface of the mating material. Another object of this invention is to provide sliding members such as piston rings having a covering of the above composite chromium plating film.

A composite chromium plating film of the present invention contains hard particles in a network of cracks formed in a hard chromium plating film. The hard particles are $Si_3N_4$ particles. Average size of the hard particles is 0.8 to 3 $\mu$m, and dispersion ratio of the hard particles is 3 to 15 percent by volume.

The composite chromium plating film is used for covering the sliding surface of sliding members such as vanes in compressors or piston rings in internal combustion engines (such as high load diesel engines or gasoline engines), thereby providing a sliding member having excellent sliding characteristics.

The composite chromium plating film of the present invention can be formed by utilizing a chromium plating bath containing specified amounts of dispersed $Si_3N_4$ particles and by repetitive performance of the composite chromium plating processes and etching processes.

The density of the network of cracks formed in the composite chromium plating processes and etching processes can be simply expressed by the number of cracks intersecting parallel lines (length 1 mm) on the plating surface. The crack density is in a range from 0 (crackless) to 200 lines per millimeter (microcrack plating). When crack density is high, the strength of the plating film decreases and conversely when the crack density is low, a high dispersion ratio of hard particles cannot be obtained. The preferred range of crack density in this invention is from 40 to 90 lines per millimeter.

The cross section of the crack is a rough V-shape, and the width of the opening must be greater than the size of the hard particle. When the width of the opening is small, the dispersion ratio of the hard particles cannot be increased and, conversely, when too large, the strength of the film decreases. A preferred opening width range is generally from 4 to 10 $\mu$m.

The edge surface of the $Si_3N_4$ particles forms the primary sliding surface in the composite chromium plating film and the chromium plating surface forms the secondary sliding surface.

The particle material in the composite chromium plating film is thought to make a difference in the wear caused on the mating sliding material. A comparison of $Al_2O_3$ composite chromium plating and $Si_3N_4$ composite chromium plating, both having the same particle size, shape and dispersion ratio, confirmed that the $Si_3N_4$ composite chromium plating is superior.

Wear on the mating sliding surface decreases when the dispersion ratio of the $Si_3N_4$ particles is increased. In the $Al_2O_3$ particles, however, the wear on the mating sliding surface increases when the dispersion ratio is increased. A high dispersion ratio for the hard particles is preferable in order to obtain satisfactory wear resistance and scuffing resistance. A chromium plating film containing $Si_3N_4$ particles at a ratio of 3 percent or more by volume can cause much less wear on the mating sliding surface compared to the chromium plating film containing $Al_2O_3$ particles.

The cracks must be enlarged in order to increase the dispersion ratio, but the increase in crack size is limited, so the dispersion ratio cannot be increased over 15 percent by volume.

The wear caused on the mating sliding surface increases when the size of the $Si_3N_4$ particles is large. When the size of the $Si_3N_4$ particles is small, the self-wear increases. A preferable average size (powder grain size) range for the hard particles is 0.8 to 3 $\mu$m.

BRIEF DESCRIPTION OF THE DRAWINGS

The aforesaid and other objects and features of the present invention will become more apparent from the following detailed description and the accompanying drawings.

FIG. 1(*a*) is a longitudinal cross sectional view showing a portion of the piston ring.

FIG. 1(*b*) is an enlarged view seen from the direction perpendicular to the plating surface, showing a portion of the composite chromium plating film of the piston ring.

FIG. 2(*a*) shows a portion of the film after one cycle of composite chromium plating processing and etching processing.

FIG. 2(*b*) shows a portion of the film after two cycles of composite chromium plating processing and etching processing.

FIG. 3 is a drawing showing the reciprocating friction testing machine.

FIG. 4 is a graph showing test data from the wear test 1.

FIG. 6 is a graph showing test data from the wear test 3.

DESCRIPTION OF THE PREFERRED EMBODIMENTS

Figure 1A:
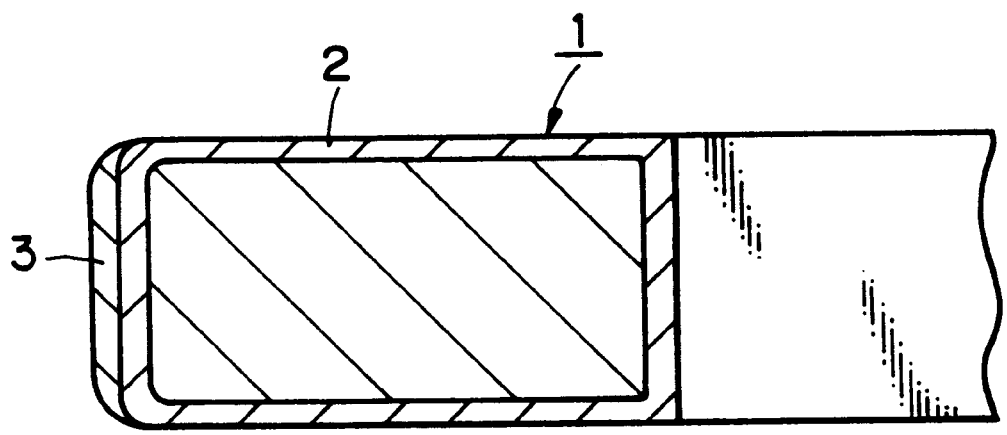
FIGS. 1(*a*) and 1(*b*) show one embodiment of this invention.
Figure 1B:
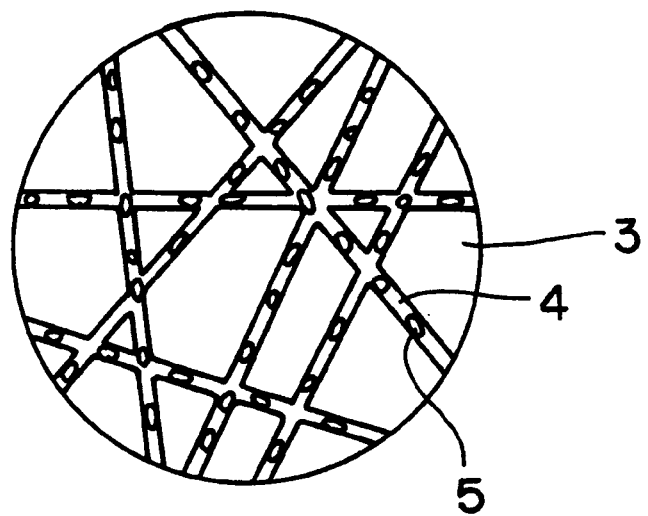

FIG. 1 shows a cross-sectional longitudinal view of one portion of the piston ring of one embodiment of the present invention. A nitrided layer 2 is formed over the entire surface of a piston ring 1 and a composite chromium plating film 3 is formed over the nitrided layer 2 in the outer circumferential surface. The composite chromium plating film 3 has a network of cracks 4 on the surface and interior of the film as seen from the direction perpendicular to the plated surface, and $Si_3N_4$ particles 5 are embedded in the cracks 4. The average particle size of the $Si_3N_4$ particles 5 is 0.8 to 3 $\mu$m and the dispersion ratio of the $Si_3N_4$ particles 5 is 3 to 15 percent by volume.

The plating process for the composite chromium plating film 3 of the piston ring 1 is described next.

After the initial composite chromium plating, a composite chromium plating process and an etching process are repetitively performed on the outer circumferential surface of the piston ring.

Conditions for composite chromium plating bath, as well as composite chromium plating process and etching process are listed in an example below. The initial composite chromium plating is a strike plating normally requiring 3 to 10 minutes and other conditions are the same as shown below.

Plating bath
$CrO_3$: 250 g/l
$H_2SO_4$: 1.0 g/l
$H_2SiF_6$: 5 g/l
Hard particles ($Si_3N_4$): 20 g/l
Average size of the hard particles is 1.2 $\mu$m.

Using plating bath containing fluoride provides superior adhesion between chromium plating layers in the composite chromium plating process and etching process cycle.

Figure 2A:
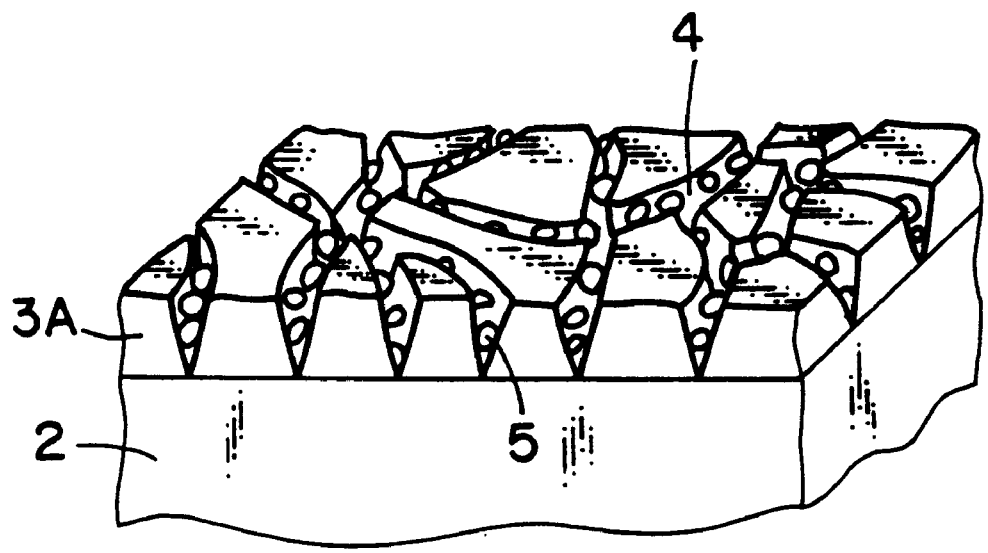
FIGS. 2(*a*) and 2(*b*) are oblique views describing the manufacturing process for the composite chromium plating film for the piston ring.
Figure 2B:
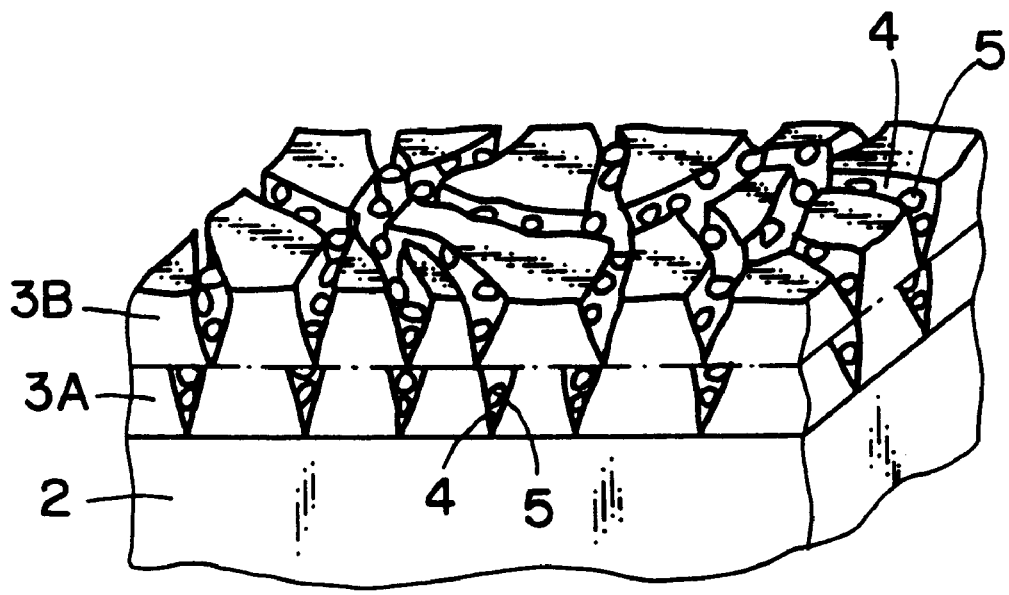

Composite chromium plating
Current density: 60 A/dm$^2$
Plating bath temperature: 55° C.
Plating time: 10 minutes
Etching
Current density: 50 A/dm$^2$
Plating bath temperature: 55° C.
Etching time: 1 minute When one cycle of composite chromium plating processing and etching processing is performed under the above conditions, a composite chromium plating film 3A is formed over the nitrided layer 2 in the outer circumferential surface of the piston ring 1, as shown in FIG. 2(*a*). On the surface of the composite chromium plating film 3A, a network of the cracks 4 is formed and the $Si_3N_4$ particles 5 are embedded in the cracks 4.

Also, as shown in FIG. 2(*b*), when the composite chromium plating processing and etching processing are repetitively performed, a further composite chromium plating film 3B is laminated on the composite chromium plating film 3A formed in the initial cycle of the processing. Accordingly, the $Si_3N_4$ particles 5 in the cracks 4 of the initial composite chromium plating film 3A are embedded in place within the films. On the surface of the composite chromium plating film 3B of the second layer, a network of the cracks 4 is formed and the $Si_3N_4$ particles 5 are embedded in the cracks 4.

Hereafter, when the composite chromium plating processing and etching processing are repetitively performed by the specified cycles, the composite chromium plating film 3 having the specified thickness is formed over the nitrided layer 2 in the outer circumferential surface of the piston ring 1.

When one cycle of the composite chromium plating processing and etching processing is performed under the above conditions, a plating thickness of approximately 10 μm can be obtained, so for instance in order to obtain the composite chromium plating film 3 with a finished thickness of 100 μm, 12 cycles are performed in order to obtain a plating thickness of 120 μm, since an extra margin (20 μm) must be added for grinding.

Next, the data obtained from the wear test using the reciprocating friction testing machine is explained.

FIG. 3 shows an outline of the reciprocating friction testing machine used in the test. A pin-shaped upper test piece 10 is supported by a fixed block 11, and a downward load is applied from above by a hydraulic cylinder 12 to press contact on a lower test piece 13. The flat base shaped lower test piece 13 is supported by a movable block 14 and moved back and forth by a crank mechanism 15. The numeral 16 denotes a load cell.

Test conditions were as follows.

Load: 98N
Speed: 600 cpm
Stroke: 50 mm
Time: 1 hour
Lubricating oil: Bearing oil having viscousness equivalent to light oil

[Wear test 1]

The effect exerted in terms of wear on the mating material according to the type of hard particles and their content in the film was tested with the above mentioned reciprocating friction testing machine.

(1) Test piece

Upper test piece: Cast iron material used for cylinder liners

Lower test piece: Lower test piece was made from steel used for piston rings and covered on the surface with composite chromium plating Using the above test pieces is convenient to estimate wear caused on the mating material by the composite chromium plating film since the interrelation of the upper and lower test pieces allows wear to develop on the upper test piece.

(2) Composite chrome plating

Composite chrome plating was the same as described for the piston ring 1 in the embodiment of this invention. However the hard particles in the plating bath were as shown in Table 1.

TABLE 1

| Type | Average particle size μm | Shape |
|---|---|---|
| $Al_2O_3$ | 4.5 | Pulverized particles |
| $Al_2O_3$ | 1.0 | Pulverized particles |
| $Si_3N_4$ | 1.2 | Pulverized particles |

(3) Test method

The wear test was performed in the different dispersion ratios (volumetric ratio) of the hard particles using the above mentioned reciprocating friction testing machine.

(4) Results

Results of wear on the upper test piece (mating material) versus the dispersion ratio of hard particles is shown in FIG. 4. The test was performed with the lower test piece covered with the usual hard chromium plating film. The wear ratio in FIG. 4 was set as 1 for the amount of wear on the upper test piece when the lower test piece was covered with the hard chromium plating film. As can be seen in FIG. 4, when the $Al_2O_3$ particle content in the composite chromium plating film was increased, the amount of wear on the upper test piece (mating material) suddenly increased. In contrast, when the $Si_3N_4$ particle content in the composite chromium plating film was increased, the amount of wear on the upper test piece (mating material) decreased. In particular, when the $Si_3N_4$ particle content was three percent or more, the amount of wear on the upper test piece (mating material) was exceedingly low compared to the composite chromium plating film containing $Al_2O_3$ particles.

[Wear test 2]

The effect exerted in terms of wear on the mating material according to the size of the $Si_3N_4$ particles was tested with the above mentioned reciprocating friction testing machine.

(1) Test piece

The upper test piece along with the lower test piece were the same as those described previously for the wear test 1.

(2) Composite chromium plating

Plating was performed just as with the composite chromium plating for the piston ring 1 described in the embodiment of this invention. The hard particles in the plating bath however were as shown in Table 2.

TABLE 2

| Type | Dispersion ratio % (volumetric ratio) | Shape |
|---|---|---|
| $Si_3N_4$ | 8.0 | Pulverized particles |

(3) Test method

The wear test was performed in the different average sizes of the $Si_3N_4$ particles using the above mentioned reciprocating friction testing machine.

(4) Results

Figure 5:
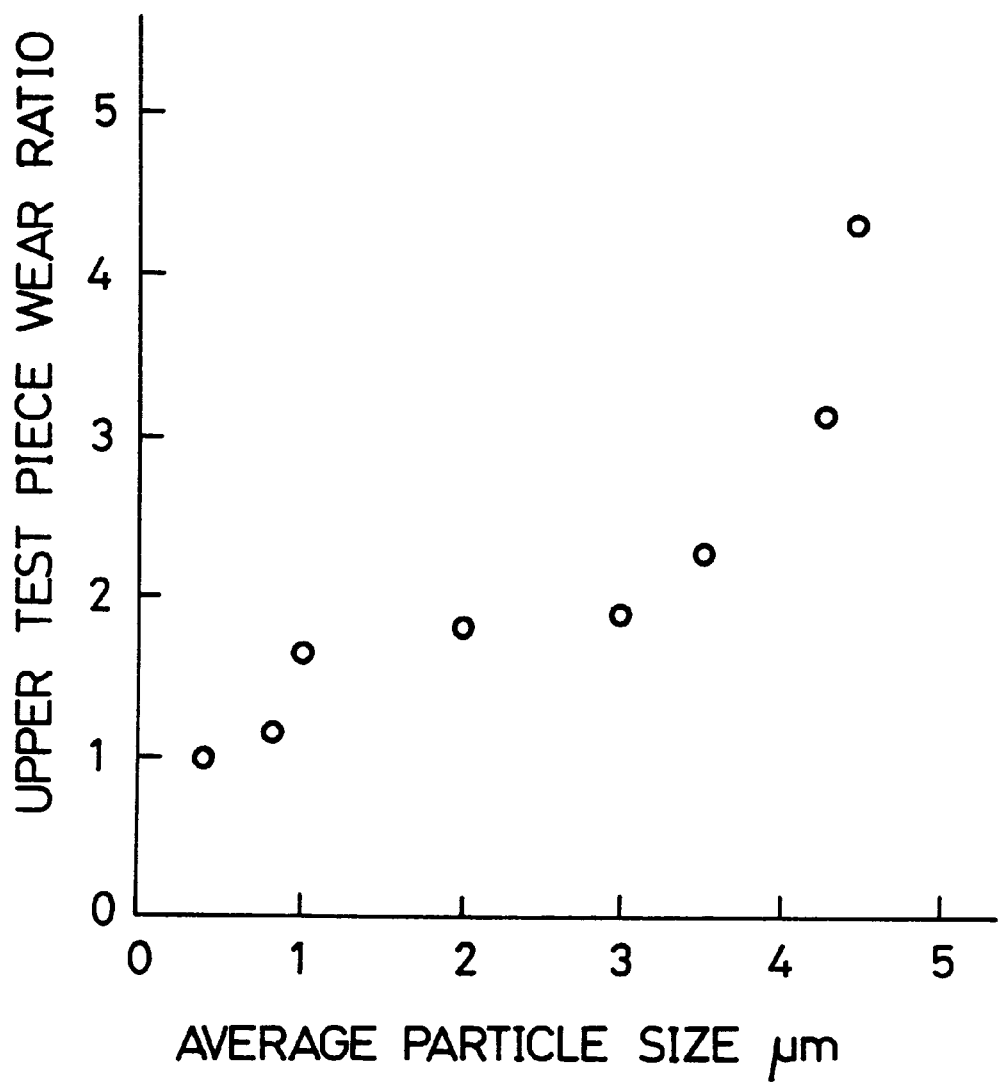
FIG. 5 is a graph showing test data from the wear test 2.

Results of wear on the upper test piece (mating material) versus the average size of the $Si_3N_4$ particles are shown in FIG. 5. The test was performed with the lower test piece covered with the usual hard chromium plating film. The wear ratio in FIG. 5 was set as 1 for the amount of wear on the upper test piece when the lower test piece was covered with the hard chromium plating film. As can be seen in FIG. 5, when the average size of the $Si_3N_4$ particles in the composite chromium plating film was increased, the amount of wear on the upper test piece (mating material) also increased. The amount of wear on the upper test piece (mating material) was found to be slight, however, in the particle size range from 0.8 to 3 μm.

[Wear test 3]

The effect exerted in terms of self-wear according to the type and size of the hard particles was tested with the above mentioned reciprocating friction testing machine.

(1) Test piece

Upper test piece: Upper test piece was made from steel used for piston rings and covered on the surface with composite chromium plating.

Lower test piece: Cast iron material used for cylinder liners.

(2) Composite chromium plating

Plating was performed just as with the composite chromium plating for the piston ring 1 described in the embodiment of this invention. The hard particles in the plating bath however were as shown in Table 3.

TABLE 3

| Type | Average particle size μm | Dispersion ratio % (volumetric ratio) | Shape |
|---|---|---|---|
| $Al_2O_3$ | 4.5 | 4.0 | Pulverized particles |
| $Al_2O_3$ | 1.0 | 10.0 | Pulverized particles |
| $Si_3N_4$ | 0.4 | 6.0 | Pulverized particles |
| $Si_3N_4$ | 0.8 | 9.0 | Pulverizd particles |
| $Si_3N_4$ | 1.2 | 8.0 | Pulverized particles |
| $Si_3N_4$ | 3.0 | 6.0 | Pulverized particles |
| $Si_3N_4$ | 4.0 | 4.5 | Pulverized particles |

(3) Test method

The wear test was performed with the above mentioned reciprocating friction testing machine.

(4) Results

Results of wear on the upper test piece are shown in FIG. 6. The test was performed with the upper test piece covered with the usual hard chromium plating film. The wear ratio in FIG. 6 was set as 1 for the amount of wear on the upper test piece when covered with the hard chromium plating film. As shown in FIG. 6, the amount of wear on the upper test piece, in other words, the amount of self-wear when the $Si_3N_4$ average particle size in the composite chromium plating film was 0.8 μm or more, was roughly equivalent to the wear amount of composite chromium plating film containing $Al_2O_3$ particles and wear resistance was found to be considerably improved compared to the hard chromium plating film. Further, when the $Si_3N_4$ average particle size in the composite chromium plating film was 0.4 μm, the wear became somewhat greater.

Although the present invention has been described with reference to the preferred embodiments, it is apparent that the present invention is not limited to the aforesaid preferred embodiments, but various modifications can be attained without departing from its scope.

What is claimed is:

1. A composite chromium plating film comprising hard particles contained in a network of cracks formed in a hard chromium plating film, wherein said hard particles consist of $Si_3N_4$ particles, wherein the average size of said hard particles is 0.8 to 3 μm, and wherein the dispersion ratio of said hard particles is 3 to 15 percent by volume.

2. A sliding member comprising a composite chromium plating film formed on the sliding surface of said sliding member, said composite chromium plating film comprising hard particles contained in a network of cracks formed in a hard chromium plating film, wherein said hard particles consist of $Si_3N_4$ particles, wherein the average size of said particles is 0.8 to 3 μm, and wherein the dispersion ratio of said hard particles is 3 to 15%.

3. A sliding member as recited in claim 2, in which said sliding member consists of a piston ring having said composite chromium plating film formed on the outer circumferential surface of said piston ring.

4. A sliding member as recited in claim 3, in which a nitrided layer is formed over the entire surface of said piston ring and is exposed on the upper and lower surfaces of said piston ring and said composite chromium plating film is formed over said nitrided layer on the outer circumferential surface of said piston ring.

* * * * *

UNITED STATES PATENT AND TRADEMARK OFFICE
CERTIFICATE OF CORRECTION

PATENT NO.: 6,013,380
DATED : January 11, 2000
INVENTOR(S): HARAYAMA et al.

It is certified that error appears in the above-identified patent and that said Letters Patent is hereby corrected as shown below:

ON THE COVER PAGE:

Item [73]; change "Tekio" to --Teikoku --.

Signed and Sealed this

Fifteenth Day of August, 2000

*Attest:*

Q. TODD DICKINSON

*Attesting Officer*  *Director of Patents and Trademarks*